United States Patent [19]
Yang

[11] Patent Number: 6,115,474
[45] Date of Patent: *Sep. 5, 2000

[54] METHOD FOR REMOVING SWITCHING NOISE DURING START AND END OF COMMUNICATION

[75] Inventor: Jin-young Yang, Suwon, Rep. of Korea

[73] Assignee: Samsung Electronics Co., Co. Ltd., Kyungki-Do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/901,784

[22] Filed: Jul. 28, 1997

[30] Foreign Application Priority Data

Sep. 30, 1996 [KR] Rep. of Korea ............... 96-43120

[51] Int. Cl.[7] .................................................. H04B 15/00
[52] U.S. Cl. ................................. 381/94.5; 379/421
[58] Field of Search ................... 381/94.5; 379/421, 379/420, 208, 351

[56] References Cited

U.S. PATENT DOCUMENTS

| | | | |
|---|---|---|---|
| 4,087,638 | 5/1978 | Hayes et al. | 455/564 |
| 4,430,742 | 2/1984 | Milleker et al. | 375/104 |
| 4,472,601 | 9/1984 | Wilson | 379/421 |

*Primary Examiner*—Ping Lee
*Attorney, Agent, or Firm*—Sughrue, Mion, Zinn, Macpeak & Seas, PLLC

[57] ABSTRACT

A method for removing a noise of a communication system, and more particularly, a method for removing switching noise generated during connecting and disconnecting a channel is provided. A method for removing switching noise during the start of communications includes the steps of calling a desired receiver by dialing the number of the desired receiver at a transmitter, connecting a channel of the receiver when the desired receiver responds to the call, muting a speaker of the receiver for a predetermined time after connecting the channel between the desired receiver and the transmitter, and connecting a channel of the transmitter after lapse of the predetermined time. Accordingly, the influence of the switching noise of the communication start and end is reduced by muting the respective transmitting and receiving terminals for the time interval generated during connecting and disconnecting the channel between the terminals.

5 Claims, 3 Drawing Sheets

METHOD FOR REMOVING SWITCHING NOISE DURING START AND END OF COMMUNICATION

BACKGROUND OF THE INVENTION

The present invention relates to a method for eliminating noise in a communication system and more particularly, to a method of eliminating switching noise generated while connecting to and disconnecting from a communication channel.

A communication method according to conventional technology is described as follows with reference to the flow chart shown in FIG. 2.

When the number of a second terminal with which a first terminal tries to communicate is pressed (step 210), the receiver is called in step 220 through a repeater. The second terminal transmits the "incoming call was received" signal to the first terminal in step 230 to acknowledge the call from the first terminal. In step 240, the first terminal receives the "incoming call was received" signal sent from the second terminal and connects to the transmitting channel from the second terminal in step 250. Then, the second terminal connects to the transmitting channel from the first terminal in step 260 after a predetermined lapse of time for processing data.

Accordingly, a time difference is generated between the steps of connecting the channel at the second terminal (step 250) and connecting the channel at the first terminal (step 260). Moreover, noise is transmitted to the second terminal during this time.

Furthermore, when the channel is disconnected by the first terminal (or the second terminal) in step 270, noise is transmitted to the second terminal (or the first terminal) during the time when a channel disconnection signal reaches the second terminal (or the first terminal) in step 280.

Therefore, when the communication speed in conventional technology is high, the problem of noise generated in the conventional technology is not very significant. However, when the communication speed is slower, significant noise is generated in a communication terminal.

SUMMARY OF THE INVENTION

It is an object of the present invention to provide a method for removing switching noise during start and end of a data communications in order to reduce noise generated due to a data processing time difference between a first terminal and a second terminal during connecting to and disconnecting from a communication channel.

To achieve the above object, a method for removing switching noise at the communication start of a communication system is provided. According to the present invention, the method comprises the steps of a first terminal calling a desired second terminal by dialing the number of the desired second terminal at the first terminal, connecting a channel of the second terminal when the desired second terminal responds to the call, muting a speaker of the second terminal for a predetermined time after connecting the channel between the desired second terminal the first terminal, and connecting a channel from the first terminal after lapse of the predetermined time.

To achieve the above object, a method for removing switching noise at the termination of communications in a communication system is provided. According to the present invention, the method comprises the steps of disconnecting a first channel in a terminal while the first channel is connected between a first terminal and a second terminal receiver, muting a speaker output of the other terminal which communicates with the terminal in which the first channel is disconnected for a predetermined time, and disconnecting a second channel of the terminal which communicates with the other terminal in which the first channel is disconnected after lapse of the predetermined time.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, a preferred embodiment of the present invention will be described in detail with reference to the attached drawings.

Figure 1:
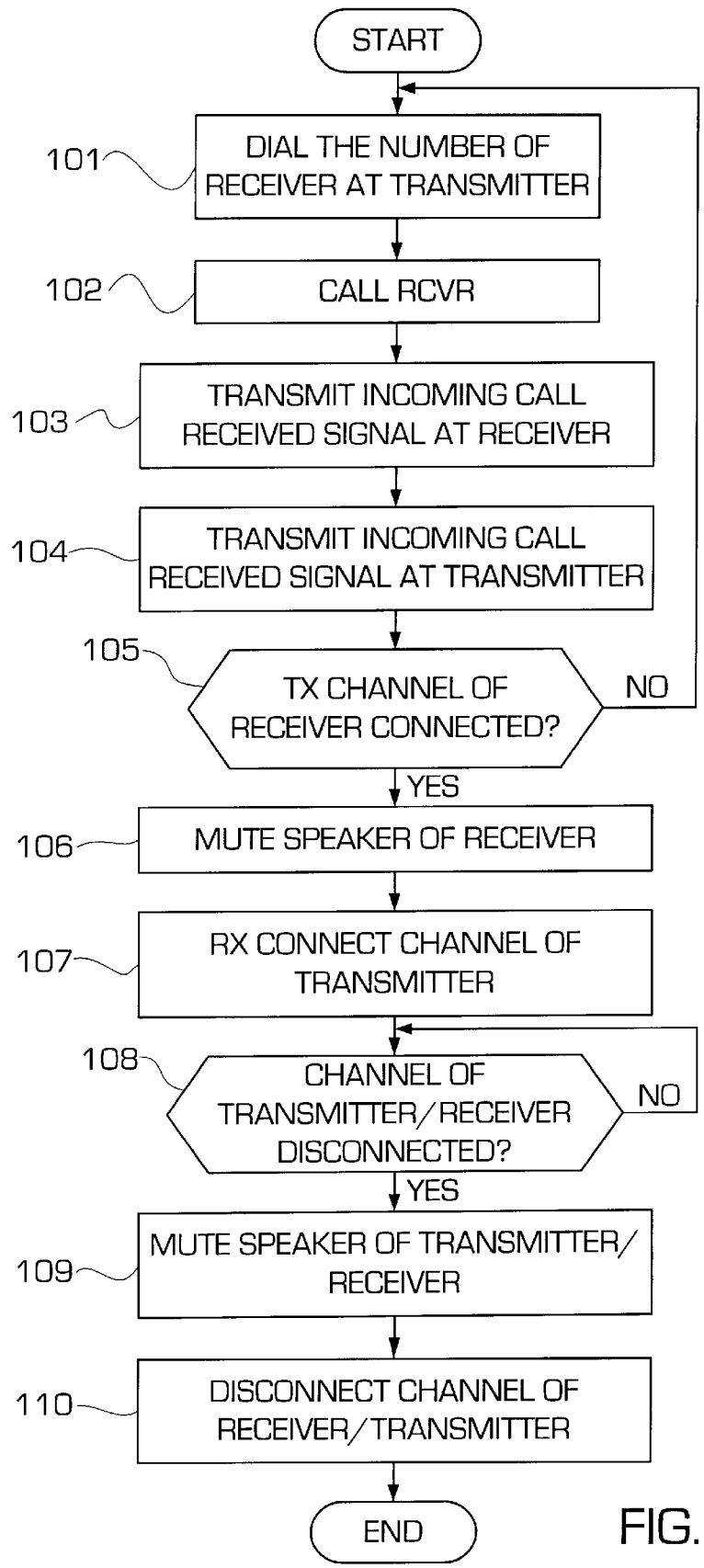
FIG. 1 is a flow chart outlining a method for removing switching noise at the time of communication start/end according to the present invention.
Figure 2:
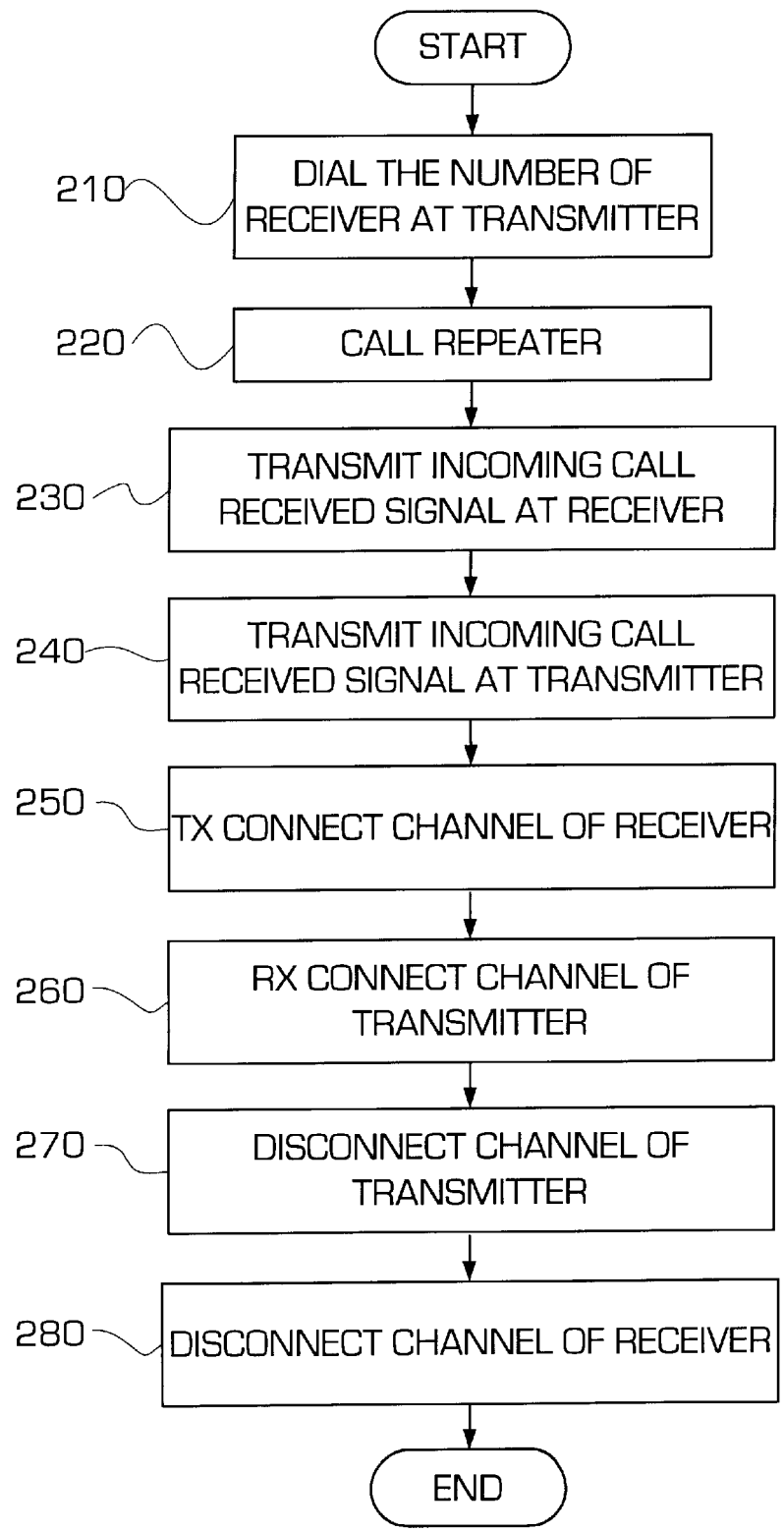
FIG. 2 is a flow chart outlining a communication method using a data communication according to conventional technology.

FIG. 1 is a flow chart outlining a method for removing switching noise at the start/end of communications according to the present invention, which includes the steps of: dialing the number of a second terminal at a first terminal (step 101); calling the dialed second terminal (step 102); transmitting an incoming call received signal from the second terminal (step 103); receiving the incoming call received signal at the first terminal (step 104); determining whether the channel of the second terminal is connected (step 105); muting a speaker of the second terminal for a first predetermined time (step 106); connecting the channel at the first terminal (step 107); determining whether the channel is disconnected during communication (step 108); muting the speaker output for a second predetermined time (step 109), and disconnecting the channel of the other party who requests the channel to be disconnected (step 110).

Figure 3A:
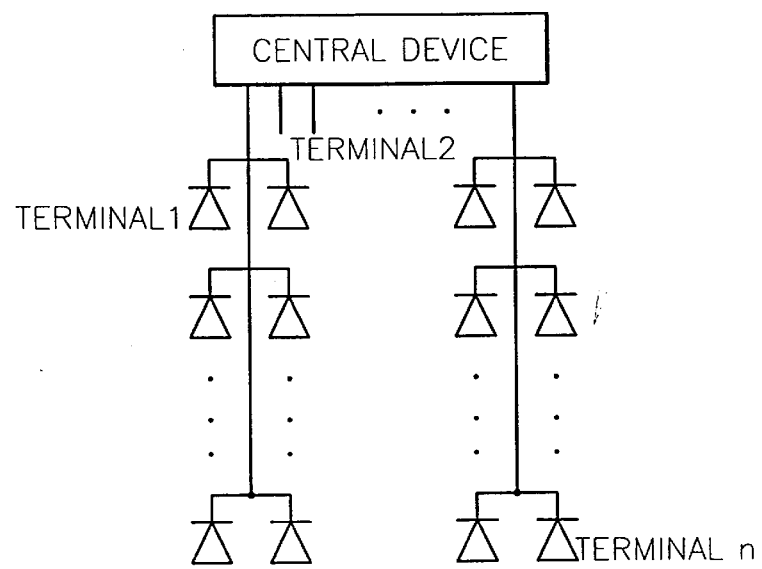
FIGS. 3A and 3B show the construction of a communicating system and a terminal to which the method of the present invention shown in FIG. 1 is applied.
Figure 3B:
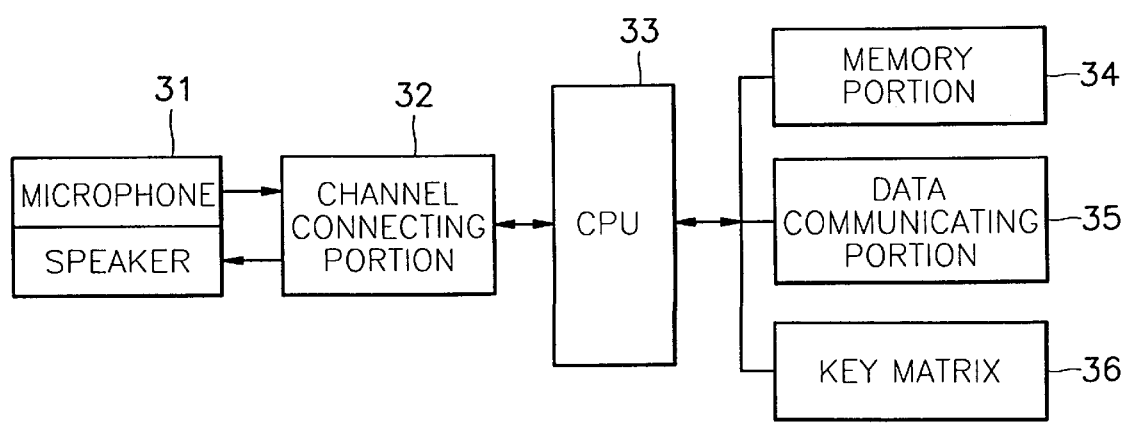

The present invention will be described after describing a data communication system which is shown in FIGS. 3A and 3B.

As shown in FIG. 3A, a central device of the data communication system is connected to a plurality of terminals and performs data communications through the respective terminals.

Each terminal is constructed by blocks as shown in FIG. 3(B).

In FIG. 3(B), an input and output portion 31, including a microphone and a speaker, receives and transmits signals. A channel connecting portion 32 connects voice input and output signals through packet communication to the channel. A central processing unit 33 processes input and output data and controls each element. A memory portion 34 stores data. A data communication portion 35 transfers data required for the packet communication such as a required communication input or a call from the other party. A key matrix 36 receives communication requests from users.

Hereinafter, the present invention will be described in detail as shown in FIG. 1 with reference to FIGS. 3A and 3B.

In a dialing step 101, the number of a second terminal to be called is input through the key matrix 36 at a first terminal in order to connect the second terminal to a channel at the second terminal.

The calling step 102 is for requesting that the channel be connected by sending a call signal to the second terminal corresponding to the specific number input at the first terminal.

The incoming call transmitting step 103 is for transmitting the "incoming call was received" signal from the second terminal in order to inform the first terminal that the call signal sent therefrom has reached the called second terminal.

In the incoming call receiving step 104, the first terminal receives the "incoming call was received" signal sent from the second terminal to confirm whether communication with the second terminal is possible. If the second terminal is busy communicating with another terminal, the dialing step 101 needs to be performed again. When the second terminal responds to a call, the channel from the second to the first terminal is connected.

The channel connection determining step 105 determines whether the first terminal is connected to the channel of the second terminal by turning off a hook in the second terminal in response to the call signal in case the second terminal is not in a communication.

It takes a certain amount of time for the first terminal to perceive the hook off of the second terminal. Specifically, a regular interval of time is generated between the point in time in which the second terminal is connected to the channel from the second to the first terminal and the point in time in which the first terminal is connected to the channel.

The equation (y communication speed×data length×2+ data processing time) represents the time interval between the point in time in which the receiving terminal is connected to the channel from the second to the first terminal and the point in time in which the first terminal is connected to the channel. Therefore, only noise is received in the second terminal during the interval.

The first mute processing step 106 is performed in order to prevent the input of such noise in the second terminal. Specifically, the speaker output of the second terminal is muted during the interval between the point in time in which the second is connected to the channel and the point in time in which the first terminal is connected to the channel so that the noise is not heard.

The channel connecting step 107 is for enabling a communication between the first terminal and the second terminal by connecting the first terminal to the channel of the transmitting terminal after the mute processing time of the first mute processing step 106.

The noise generated during an initial channel connection between the first terminal and the second terminal is removed through the above steps.

Hereinafter, a method for preventing a communication termination switching noise will be described.

Communication may be terminated by either the transmitting or receiving party after the communication setup is performed between the first and second terminals in the above channel connecting step 107. Communication is terminated by turning on the hook of the input and output portion 31 in the first terminal or the second terminal.

The channel disconnection determining step 108 is for determining whether a hook-on operation has been performed in one of the communicating terminals in order to disconnect the channel.

When the hook-on operation is performed by either of the terminals to terminate the communication, the channel of the terminal in which the communication is terminated (the terminal in which the hook-on operation is performed) is immediately disconnected. However, the terminal of the other party which is under communication receives a switching noise since its channel is not disconnected, but rather is still connected during the time when the hook-on signal is received.

Namely, a time interval (y communication speed×data length×2+ data processing time) is generated representing the time required to disconnect a channel between the communicating terminals during the termination of the communication.

Therefore, the second mute processing step 109 is performed in order to prevent the noise generated due to the above-mentioned disconnection interval. Specifically, the output of noise is eliminated by muting the output of the other terminal, which communicates with the terminal whose channel has been disconnected by performing the hook-on operation, during the time interval generated during the disconnection of the channel between the communicating terminals.

The other party channel disconnection step 110 is for disconnecting the channel from the other terminal with which the communication is performed by the central processing unit's reading the hook-on signal of the channel disconnection.

In the present invention, the influence of noise generated during termination of the communication is reduced through the above steps.

According to the present invention as described above, the influence of the switching noise of the communication start and end can be reduced by muting the respective transmitting and receiving terminals for the time interval generated during connecting and disconnecting the channel between the terminals.

What is claimed is:

1. A method for eliminating switching noise at the start of communications in a communication system having plural terminals, the method comprising the steps of:

at a first terminal, calling a second terminal by inputting a number of the second terminal and transmitting it to the second terminal;

at the second terminal, responding to a receipt of the number by sending a confirmation signal to the first terminal and by opening a first channel from the first terminal;

at the second terminal, muting a speaker connected to said first channel for a predetermined time interval after connecting the second terminal to said first channel; and at the first terminal, responding to the confirmation signal and opening a transmission of information on said first channel after said predetermined time interval, wherein said predetermined time interval corresponds to a time interval between when said second terminal is connected to said first channel and when said first terminal is connected to said first channel.

2. A method for removing switching noise as claimed in claim 1, wherein said predetermined time interval is calculated by the equation: (communication speed)×(data length)×2 + (data processing time).

3. A method for removing switching noise at the termination of communications in a communication system, the method comprising the steps of:

disconnecting a first channel in a terminal which is connected between terminals of a transmitter and a receiver;

muting for a predetermined time interval a speaker output of the other terminal which communicates with the terminal in which said first channel is disconnected; and disconnecting a second channel of the terminal which communicates with the other terminal in which said first channel is disconnected after lapse of said predetermined time interval.

4. A method for removing switching noise as claimed in claim 3, wherein said predetermined time interval is calculated by the equation: (communication speed)×(data length)×2 + (data processing time).

5. A method for removing switching noise as claimed in claim 3, wherein said predetermined time interval corresponds to the time required to disconnect a channel between said terminals during termination of the communication.

* * * * *